(12) United States Patent
Latif

(10) Patent No.: US 12,503,220 B2
(45) Date of Patent: Dec. 23, 2025

(54) GEAR DISCONNECT MECHANISM FOR LANDING GEAR ACTUATOR EMERGENCY DEPLOYMENT

(71) Applicant: Woodward, Inc., Fort Collins, CO (US)

(72) Inventor: Rana Kamran Latif, Grand-Prairie, TX (US)

(73) Assignee: Safran Electronics & Defense, Avionics USA, LLC, Grand-Prairie, TX (US)

( * ) Notice: Subject to any disclaimer, the term of this patent is extended or adjusted under 35 U.S.C. 154(b) by 0 days.

(21) Appl. No.: 18/834,570

(22) PCT Filed: Sep. 7, 2023

(86) PCT No.: PCT/US2023/032213
§ 371 (c)(1),
(2) Date: Jul. 30, 2024

(87) PCT Pub. No.: WO2025/053847
PCT Pub. Date: Mar. 13, 2025

(65) Prior Publication Data
US 2025/0250002 A1  Aug. 7, 2025

(51) Int. Cl.
*B64C 25/24* (2006.01)
*B64C 25/20* (2006.01)

(52) U.S. Cl.
CPC .............. *B64C 25/24* (2013.01); *B64C 25/20* (2013.01)

(58) Field of Classification Search
CPC ................................ B64C 25/24; B64C 25/20
See application file for complete search history.

(56) References Cited

U.S. PATENT DOCUMENTS

| | | | | |
|---|---|---|---|---|
| 2,476,376 A | * | 7/1949 | Laraque | B64C 25/24 254/93 A |
| 2016/0025199 A1 | * | 1/2016 | Boone | H02K 7/116 74/89.38 |
| 2018/0334250 A1 | * | 11/2018 | Klode | B64C 25/24 |

FOREIGN PATENT DOCUMENTS

| | | |
|---|---|---|
| EP | 3 403 928 A1 | 11/2018 |
| WO | 2016014676 A1 | 1/2016 |

OTHER PUBLICATIONS

International Search Report and Written Opinion mailed Feb. 7, 2024, issued in corresponding International Application No. PCT/US2023/032213, filed Sep. 7, 2023, 13 pages.

* cited by examiner

*Primary Examiner* — Tye William Abell
(74) *Attorney, Agent, or Firm* — Christensen O'Connor Johnson Kindness PLLC

(57) ABSTRACT

An aircraft (40) landing gear includes a main beam (52) coupled to the aircraft (40) for reciprocating movement between a stowed position and a deployed position. An actuator (100) is configured to drive the reciprocating movement of the main beam (52). The actuator (100) includes a ball screw (140) and a motor (110). The motor (110) has an output shaft (112) operably coupled to the ball screw (140) through a gear train and configured to drive selective rotation of the ball screw (140). The actuator (100) further includes a disconnect mechanism (300) with a disconnect fitting (330) rotatably mounted to the ball screw (140). A biasing fitting (302) engages the disconnect fitting (330) to rotate the disconnect fitting (330) between a first position and a second position. The disconnect fitting (330) transfers rotation of the output shaft (112) to the ball screw (140) when the disconnect fitting (330) is in the first position. The (Continued)

ball screw (140) is isolated from the output shaft (112) when the disconnect fitting (330) is in the second position.

15 Claims, 5 Drawing Sheets

GEAR DISCONNECT MECHANISM FOR LANDING GEAR ACTUATOR EMERGENCY DEPLOYMENT

BACKGROUND

An aircraft landing gear assembly is generally movable between a deployed (extended) condition, for take off, landing, and taxiing, and a stowed (retracted) condition for flight.

An actuator may be provided for moving the landing gear assembly between the deployed and stowed conditions. This type of actuator is known in the art as a "retraction actuator." A retraction actuator may have one end coupled to the airframe and another end coupled to the main strut such that extension and retraction of the actuator results in movement of the main strut between deployed and stowed conditions.

Landing gear actuators are required to have an emergency deployment mechanism in case of a system failure such as power loss. Under such failure, the landing gear shall be able to deploy under gravitational force. Hydraulic actuators achieve this function by means of hydraulic pressure release, which allows the system to backdrive and deploy the landing gear. However, for electromechanical actuators, the backdriving of the actuator requires larger external force due to inherent system drag.

The present disclosure provides embodiments of disconnect mechanisms suitable for use with landing gear assemblies having electromechanical actuators. Disclosed embodiments include a ball screw driven by an electric motor through a gear train. The disconnect mechanisms selectively isolate the gear train output from the ball screw to reduce inherent system drag so that the landing gear can deploy under gravitational forces.

SUMMARY

Embodiments of landing gear disconnect mechanisms are set forth below according to technologies and methodologies of the present disclosure. The disconnect mechanisms are configured such that in the event of a system failure, the actuator can be put in a disconnected state to reduce inherent system drag so that the landing gear can deploy under the force of gravity.

A first representative embodiment of a landing gear system for an aircraft landing gear includes a main beam coupled to the aircraft for reciprocating movement between a stowed position and a deployed position. An actuator is configured to drive the reciprocating movement of the main beam. The actuator includes a ball screw and a motor. The motor has an output shaft operably coupled to the ball screw through the gear train and configured to drive selective rotation of the ball screw. The actuator further includes a disconnect mechanism with a disconnect fitting rotatably mounted to the ball screw. A biasing fitting engages the disconnect fitting to rotate the disconnect fitting between a first position and a second position. The disconnect fitting transfers rotation of the output gear shaft to the ball screw when the disconnect fitting is in the first position. The ball screw is isolated from the output gear shaft when the disconnect fitting is in the second position.

In any embodiment, the motor drives rotation of a gear having a splined surface, and the disconnect fitting includes an engagement element disposed on an elongate member, wherein rotation of the disconnect fitting engages and disengages the engagement element from the splined surface.

In any embodiment, the elongate member has a first end and a second end, the first end and the second end defining an angle therebetween.

In any embodiment, the angle is between 100° and 150°.

In any embodiment, the biasing fitting is configured for sliding translation along a centerline of the ball screw between a connection position and an isolation position, wherein translation of the biasing fitting from the isolation position to the connection position engages the biasing fitting with the first end of the elongate member to rotate the disconnect fitting.

In any embodiment, engagement of the biasing fitting with the elongate member when the biasing fitting is in the connection position maintains engagement of the engagement element with the splined surface.

In any embodiment, translation of the biasing fitting from the connection position to the isolation position engages the biasing fitting with the second end of the elongate member to rotate the disconnect fitting.

In any embodiment, engagement of the biasing fitting with the second end of the elongate member when the biasing fitting is in the isolation position prevents engagement of the engagement element with the splined surface.

In any embodiment, the biasing fitting has an ovoid shape.

In any embodiment, the biasing fitting is coupled to a first end of a rod slidingly disposed within the ball screw for translational movement along the centerline of the ball screw.

In any embodiment, an actuation element is coupled to a second end of the rod, the actuation element being configured to move the biasing fitting from the connection position to the isolation position.

In any embodiment, the actuation element is a cable.

In any embodiment, the disconnect mechanism further comprises a biasing element urging the biasing fitting toward the connection position.

In any embodiment, the disconnect mechanism further comprises a locking feature configured to resist the biasing element to maintain the biasing fitting in the isolated position.

In any embodiment, the locking feature comprises a locking fitting slidably received within an aperture formed in the rod when the biasing fitting is in the isolated position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
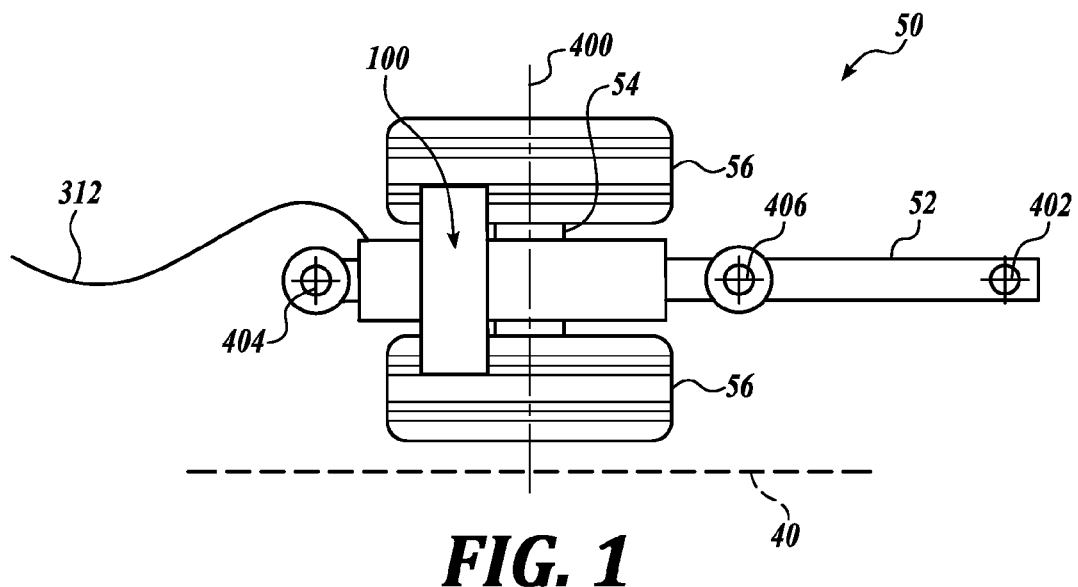
FIG. 1 shows a front elevational view of an exemplary embodiment of a landing gear assembly for an aircraft according to aspects of the present disclosure, wherein the landing gear assembly is in a stowed position.
Figure 2:
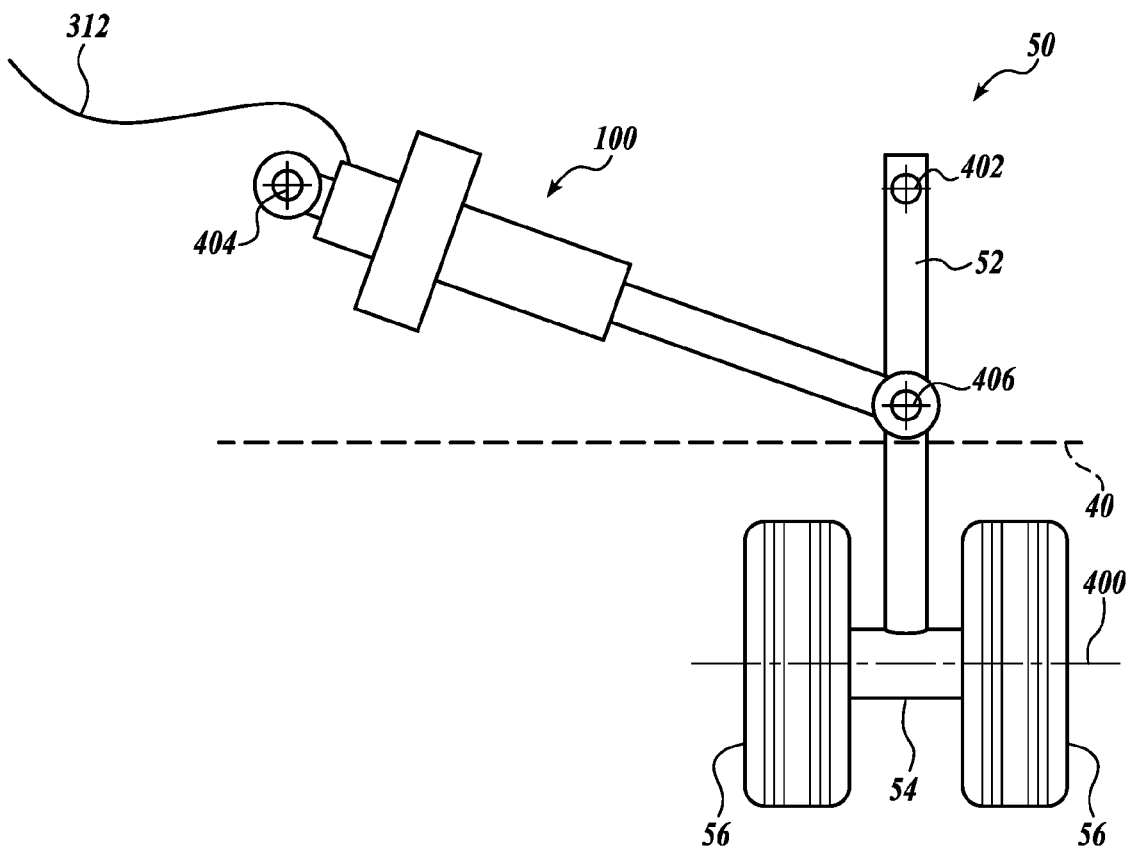
FIG. 2 shows a front elevational view thereof, wherein the landing gear assembly is in a deployed position.

Referring to FIGS. 1 and 2, a retractable landing gear assembly 50 for an aircraft 40 according to aspects of the present disclosure is shown. The landing gear assembly 50 includes a main beam 52 coupled to the aircraft 40 for reciprocal movement between the stowed position of FIG. 1 and the deployed position of FIG. 2. In the illustrated embodiment, one end of the main beam 52 is rotatably coupled to the aircraft 40 about an axis 402. An axle 54 is disposed on the other end of the main beam 52 and has a pair of wheels rotatably mounted thereto about an axis 400. When the aircraft 40 is on the ground, i.e., during takeoff, landing, and taxiing, the landing gear assembly 50 is in the extended position, and the wheels 56 rollingly engage the ground to support the aircraft. When the aircraft 40 is in flight, the landing gear assembly 50 is retracted upward into the aircraft to reduce drag.

The landing gear assembly 50 includes an actuator 100 that drives the main beam 52 through extension and retraction motions. In the illustrated embodiment, the actuator 100 is a linear actuator rotatably coupled about an axis 404 at one end to the aircraft 40. The other end of the actuator 100 is rotatably coupled about an axis 406 to the main beam 52 of the landing gear assembly 50. Extension of the actuator drives the landing gear assembly 40 toward the deployed position and retraction of the actuator drives the landing gear assembly toward the stowed position.

Figure 3:
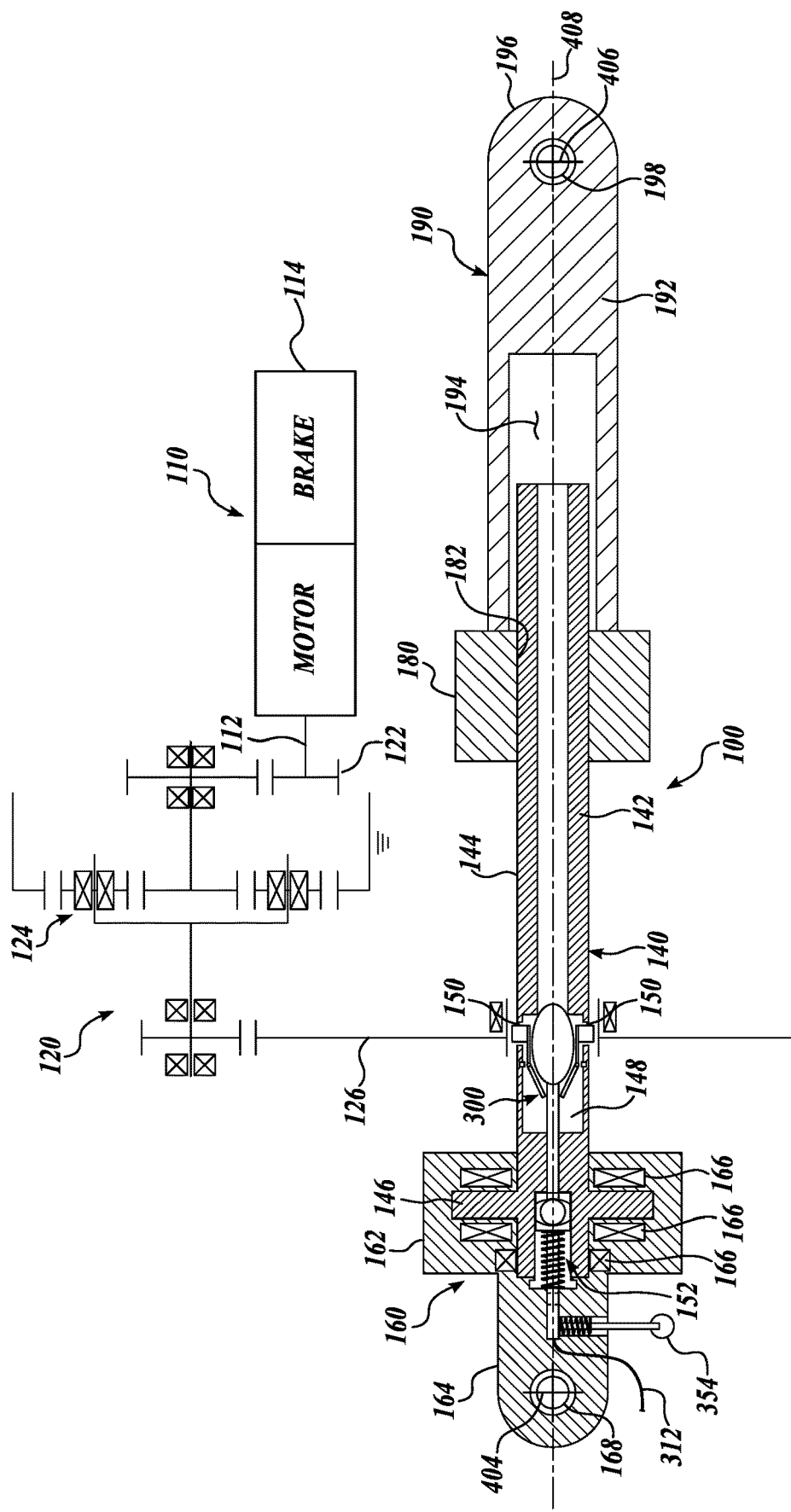
FIG. 3 shows a schematic partial view of the landing gear assembly of FIG. 1, wherein a disconnect mechanism is in a connected state.
Figure 4:
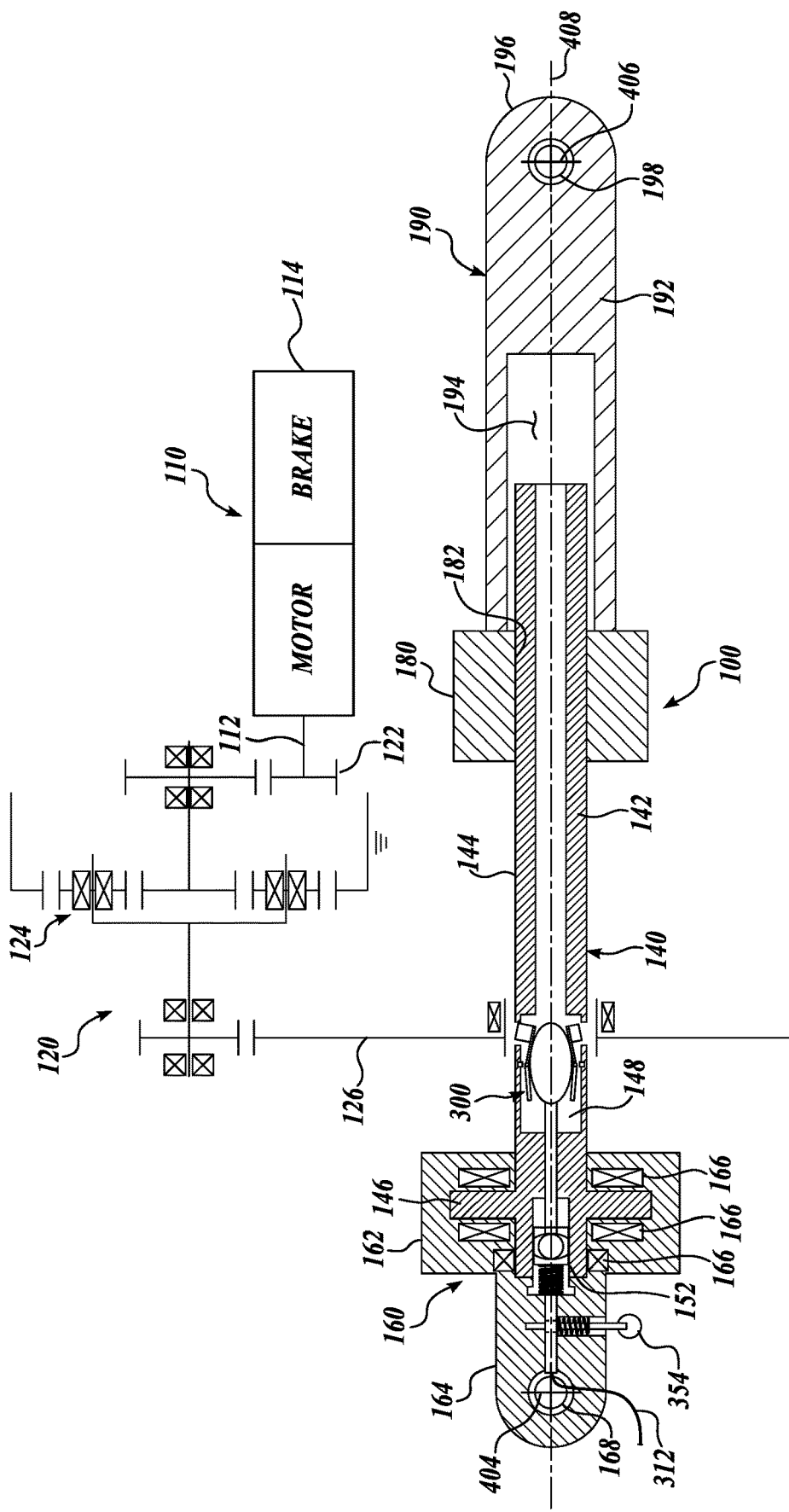
FIG. 4 shows a partial schematic view thereof, wherein the disconnect mechanism is in a disconnected state.

Referring now to FIGS. 3 and 4, an exemplary embodiment of the linear actuator 100 according to aspects of the present disclosure will be described. In the illustrated embodiment, the actuator 100 is a ball screw actuator that includes a ball screw 140 in threaded engagement with a ball nut 180. The ball screw 140 is selectively rotatable about a centerline 408, and the ball nut 180 is fixed in rotation about the central axis. Accordingly, rotation of the ball screw 140 in a first direction drives the ball nut 180 in a first linear direction, and rotation of the ball screw in a second direction drives the ball nut in a second linear direction.

The ball screw 140 is a known ball screw having an elongate body 142 with external threads 144 formed thereon. One end of the ball screw 140 is mounted to a ball screw fitting 160. As shown in FIGS. 3 and 4, a radial flange 146 extends from the end of the body 142 of ball screw 140. A plurality of bearings 166 is mounted within a body 162 of the ball screw fitting 160 and engages the body 142 and flange 146 of the ball screw 140 to allow rotation of the ball screw about the centerline 408 relative to the ball screw fitting, while restraining translation of the ball screw 140 relative to the ball screw fitting 160 along the centerline 408.

The ball screw fitting 160 includes a lug 164 extending from the body 162. In the illustrated embodiment, the lug 164 has bushed hole 168 formed therein so that the ball screw fitting 160 can be rotatably coupled to the aircraft about axis 404. In any embodiment, the hole 168 has a spherical bearing mounted therein to provide pivotal mounting of the ball screw fitting 160 to the aircraft. In any embodiment, the ball screw fitting 160 is rotatably or pivotally coupled to the aircraft in any suitable matter.

Still referring to FIGS. 3 and 4, the ball nut 180 is fixedly mounted to a ball nut fitting 190. The ball nut fitting 190 has an elongate body 192 with a cavity 194 formed at the end to which the ball nut 180 is mounted. The cavity is sized and configured to receive at least a portion of the ball screw 140 during extension and retraction of the actuator 100.

A lug 196 is formed on the ball nut fitting 190 opposite to the ball nut 180. In the illustrated embodiment, the lug 196 has bushed hole 198 formed therein so that the ball nut fitting can be rotatably coupled to the main beam 52 about an axis 406. In any embodiment, the hole 198 has a spherical bearing mounted therein to provide pivotal mounting of the ball nut fitting 190 to the main beam. In any embodiment, the ball nut fitting 190 is rotatably or pivotally coupled to the main beam in any suitable matter.

The linear actuator 100 includes a motor 110 connected to the ball screw 140 by a transmission 120 and a disconnect mechanism 300. As will be described in further detail, the motor 110 selectively drives rotation of the ball screw 140. The motor 110 includes an output shaft 112 selectively rotatable in a first direction and a second direction. In any embodiment, motor 110 is an electric motor. In any embodiment, the motor 110 may include a brake 114. In any embodiment, the motor is any motor suitable for providing a rotational force to drive actuation of an actuator.

The output shaft 112 of the motor 110 is coupled to the ball screw 140 by a transmission 120 such that rotation of the output shaft 112 in first and second directions drives rotation of the ball screw 140 in first and second directions, respectively, about the centerline 408 of the ball screw. In any embodiment, the transmission 120 is configured such that rotation of the output shaft 112 drives rotation of the ball screw 140 in the same direction as the output shaft. In any embodiment, the transmission 120 is configured such that rotation of the output shaft 112 drives rotation of the ball screw 140 in a direction opposite the direction of the output shaft.

The transmission 120 includes an input gear 122 coupled to the output shaft 112 of the motor 110 and an output gear 126 that selectively engages ball screw 140. In the illustrated embodiment, the input gear 122 and the output gear 126 are connected by a planetary gear assembly 124. In any embodiment, the transmission 120 transforms the input torque and rotational speed provided by the motor 110 to the input gear 122 into a suitable output torque and rotational speed provided by the output gear 126 to the ball screw 140.

Figure 5:
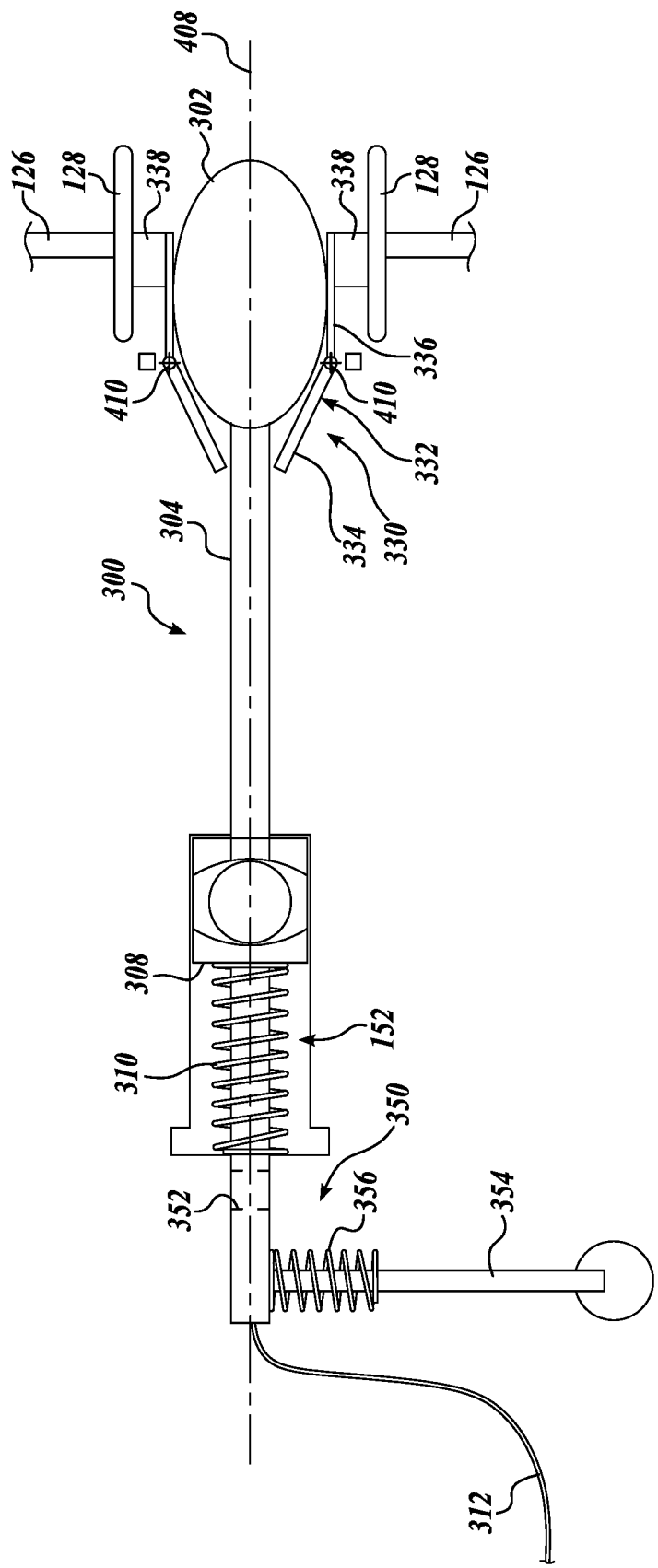
FIG. 5 shows a schematic view of the disconnect mechanism of FIG. 3.
Figure 6:
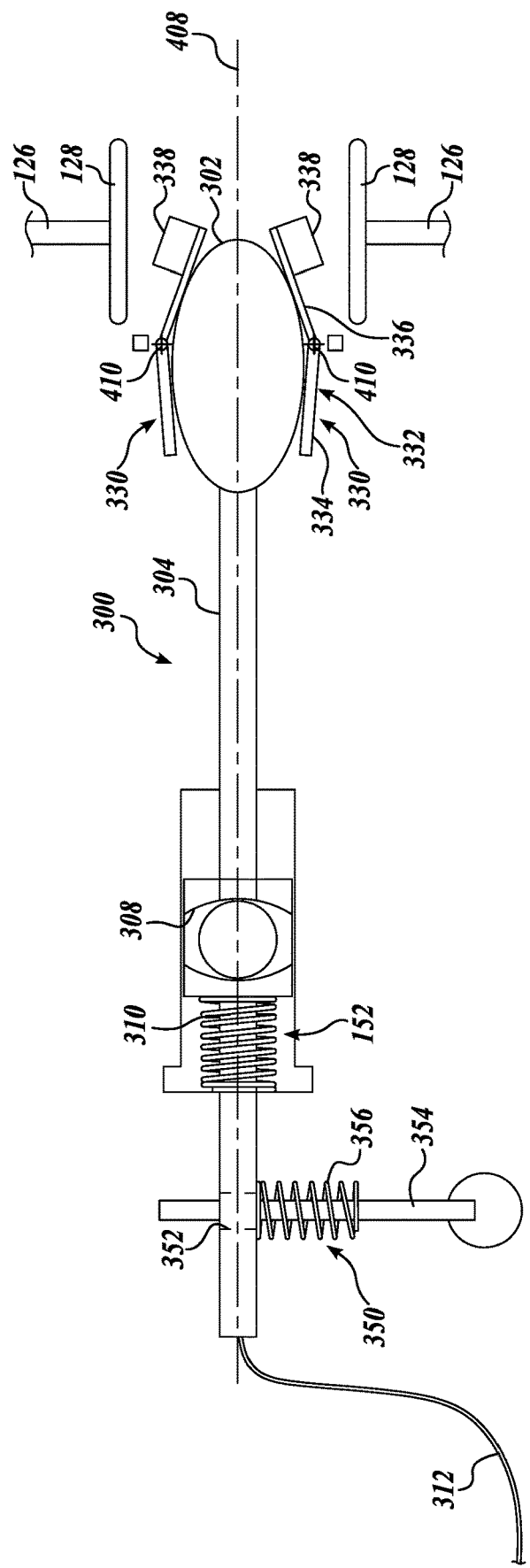
FIG. 6 shows a schematic view of the disconnect mechanism of FIG. 4.

The ball screw 140 includes a disconnect mechanism 300 that selectively moves between a connected state, shown in FIGS. 3 and 5, and a disconnected state, shown in FIGS. 4 and 6. In the connected state, the disconnect mechanism 300 engages the output gear 126 of the transmission 120 so that rotation of the output shaft 112 of the motor 110 drives rotation of the ball screw 140. When the disconnect mechanism 300 is in the disconnected state, the disconnect mechanism is disengaged from the output gear 126 of the transmission 120 so that the ball screw 140 is isolated from the transmission 120 and the ball screw 140 is rotatable independent of the output shaft 112 of the motor 110.

Referring now to FIGS. 3-6, the disconnect mechanism 300 will now be described. The disconnect mechanism 300 includes a biasing fitting 302 and one or more disconnect fittings 330 dispose within a cavity 148 formed within the body 142 of the ball screw 140. The one or more disconnect fittings 330 are positioned circumferentially around the centerline 408 of the ball screw. As best shown in FIGS. 5 and 6, each disconnect fitting 330 includes an arm 332 rotatably coupled to the ball screw 140 about an axis 410. In any embodiment, the disconnect mechanism 300 includes four disconnect fittings 330 spaced evenly about the centerline 408 of the ball screw 140. In any embodiment, the disconnect mechanism 300 includes any suitable number of disconnect fittings 330 positioned in any suitable configuration within the cavity 148 of the ball screw 140.

Each arm 332 includes a first end 334 and a second end 336 forming an angle. In the illustrated embodiment, the angle is approximately 135°. In any embodiment, the angle is between 130° and 140°, between 100° and 150°, or of any other suitable value. In the illustrated embodiment, the axis 408 about which the arm 332 rotates is located at the vertex of the angle. In any embodiment, the axis may be located on the first end 334 or the second end 336 of the arm 332 so that the vertex of the angle is offset from.

Each disconnect fitting 330 has an engagement element 338 positioned on the second end 336. The engagement element 330 is sized and configured to extend through a corresponding aperture 150 formed in the body 142 of the ball screw 140 when the disconnect mechanism 300 is in the connected state. In the illustrated embodiment, each engagement element 338 includes one or more splines. As shown in FIG. 5, when the disconnect mechanism 300 is in the connected state, the engagement elements 338 cooperate to form an external splined surface on the ball screw 140 that engages an internal splined surface 128 formed on the output gear 126 of the transmission 120. With the engagement elements 338 engaged with the splined surface 330 of the output gear, rotation of the output gear 126, which is driven by the motor, drives rotation of the ball screw 140.

When the disconnect mechanism 300 is in the disconnected state, as shown in FIG. 6, the engagement elements 338 are disengaged from the internal splined surface 128 of the output gear 126 of the transmission 120. With the engagement elements 338 disengaged from the output gear 126, the ball screw 140 is isolated from the motor 110 and is free to backdrive unrestrained by the motor.

The disconnect mechanism 300 includes a biasing fitting 302 located within the cavity 148 and engaging the disconnect fittings 330. The biasing fitting 302 is mounted to one end of a rod 304 that is disposed within the ball screw 140 for sliding movement along the centerline 408 of the ball screw 140. A second end of the rod 304 extends through a recess 152 formed in an end of the ball screw 140 proximate to the ball screw fitting 160. In the illustrated embodiment, the biasing fitting 302 has an ovate shape. In any embodiment, the biasing fitting 302 has a spherical shape, a cylindrical shape, or any other suitable shape.

Referring to FIGS. 5 and 6, a ball housing 308 is slidingly disposed within the recess 152 and fixedly secured to the rod 304. A biasing element 310 is disposed within the recess 152 and engages the ball housing 308 to urge the biasing element in the direction of the biasing fitting 302. In any embodiment, the biasing element 310 is a compression spring configured to urge the ball housing 308 in the direction of the biasing fitting 302. In any embodiment, the biasing element is a tension spring, a gas spring, a torsional spring, or any other suitable biasing element configured to urge the ball housing 308 in the direction of the biasing fitting 302.

The disconnect mechanism 300 further includes an actuation element 312 configured to selectively drive the biasing fitting 302 toward the cavity 148, i.e., from its position when the disconnect mechanism 300 is in the connected state (shown in FIG. 5) to its position when the disconnect mechanism 300 is in the disconnected state (shown in FIG. 6). In any embodiment, the actuation element 312 is a cable connected at one end to the rod 304 and another end to a lever accessible from within the aircraft, such as within the cockpit. When the lever is pulled, the cable pulls the rod 304 and biasing fitting 302 to the left as shown in FIGS. 5 and 6, i.e., against the biasing force of the biasing element 310. In any embodiment, the actuation element may be an electric actuator (such as a solenoid) or a hydraulic actuator configured to drive the rod 304 and the biasing fitting 302 against the biasing force of the biasing element 310. In any embodiment, the actuation element is any suitable element that is configured to drive the rod 304 and the biasing fitting 302 against the biasing force of the biasing element 310, manually or automatically.

After the actuation element 312 moves the rod 304 and biasing fitting 302 to the position shown in FIG. 6, a locking feature 350 engages the rod 304 to maintain the rod and biasing fitting in position. That is, the locking feature 350 maintains the disconnect mechanism in the disconnected state when the biasing fitting 302 has reached the isolation position.

In the illustrated embodiment, the locking feature 350 includes a locking fitting 354 slidably mounted perpendicular to the centerline 408 of the rod 304. A biasing element 356 is configured to urge an end of the locking fitting 354 to maintain sliding contact with the rod. As shown in FIG. 5, an aperture 352 is formed in the rod 304 and is sized and configured to receive a portion of the locking fitting 354 when the disconnect mechanism 300 is in the disconnected state of FIG. 6. To move the disconnect fitting 300 back to the connected state of FIG. 5, the locking fitting 354 is disengaged from the aperture 352, after which the biasing element 310 drives the ball housing 308, rod 304, and biasing fitting 302 back to the connected position.

In the illustrated embodiment, the locking fitting 354 is a rod, and the biasing element 356 is a compression spring. In any embodiment, the locking fitting 354 is a latch. In any embodiment, the locking fitting 354 is a ratchet and pawl combination. In any embodiment, the biasing element is a compression spring, a tension spring, a torsion spring, or any other suitable element configured to apply a biasing force to the locking fitting. In any embodiment the locking feature is any suitable configuration that releasably secures the disconnect mechanism 300 in the engaged state.

Embodiments of the disclosed disconnect mechanism 300 enable a landing gear assembly 50 to be manually deployed in the event of a drive system failure. Under normal operating conditions, the disconnect mechanism 300 is in the connected state of FIGS. 3 and 5. With the disconnect mechanism 300 is in the connected state, the motor 110 is operatively connected to the ball screw 140 so that the actuator 100 can drive the landing gear assembly 50 through the extension and retraction motions.

When the disconnect mechanism 300 is in the connected state, the biasing fitting 302 engages the second end 336 of the arm 332 so that each engagement element 338 extends through the corresponding aperture 150 in the ball screw 140 to maintain engagement with the splined surface 128 of the output gear 126 of the transmission 120. Thus, when the disconnect mechanism 300 is in the connected state, rotation of the ball screw 140 is restrained by the output shaft 112 of the motor 110.

In the event of a system failure that prevents extension of the landing gear assembly 50, the disconnect mechanism 300 can be moved to the disconnected state of FIGS. 4 and 6, which allows the landing gear assembly to extend under the force of gravity. To move the disconnect mechanism 300 from the connected state of FIGS. 3 and 5 to the disconnected, a user activates the actuation element 312. In the illustrated embodiment, activating the actuation element 312 comprises pulling on the cable.

Activating the actuation element 312 drives the biasing fitting 302, the rod 304, and the ball housing 308 against the force of the biasing element 310, i.e., to the left as shown in FIGS. 3-6, until the locking feature 350 engages to lock the rod 304 in position. As the biasing fitting 302 moves to the left, the biasing fitting engages the first end 334 of each arm 332 of the disconnect fitting 330, which rotates each arm about its respective axis 410. The rotation of the arms 332 moves the second end 336 of each arm and, therefore, the corresponding engagement element 338, away from the splined surface 128 of the output gear 126 until the disconnect fitting 330 is isolated from the output gear 126.

With the locking feature engaged, the biasing fitting 302, the rod 304, and the ball housing 308 are prevented from translation in either direction along the centerline 408 of the ball screw 140, and the disconnect fitting 330 is locked in the disengaged state. Because the ball screw 140 is isolated from the transmission 120 and the motor 110, the ball screw 140 is free to backdrive under an external load. More specifically, the weight of the landing gear assembly 50 urges the landing gear assembly toward the deployed position, and the ball screw 140, unrestrained by the motor, backdrives until the landing gear assembly 50 reaches the deployed position.

When the landing gear reaches the deployed position, the user may disengage the locking fitting 350. With the locking fitting 350 disengaged, the biasing fitting 302, the rod 304, and the ball housing 308 return to the connected state of FIGS. 3 and 5. In the connected state, the ball screw 140 is again connected to the motor 110 through the transmission 120, and the motor provides resistance against rotation of the balls screw 140, thereby assisting the landing gear downlocks to lock the landing gear in the deployed position.

While illustrative embodiments have been illustrated and described, it will be appreciated that various changes can be made therein without departing from the spirit and scope of the invention.

It will be appreciated that the disclosed embodiments are exemplary only and should not be considered limiting. In some embodiments, landing gear configuration, motor, and transmission can vary within the scope of the present disclosure. These and other variations are contemplated and should be considered within the scope of the present disclosure.

The present application may reference quantities and numbers. Unless specifically stated, such quantities and numbers are not to be considered restrictive, but exemplary of the possible quantities or numbers associated with the present application. Also, in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. An aircraft landing gear, comprising:
    a main beam coupled to the aircraft for reciprocating movement between a stowed position and a deployed position; and
    an actuator configured to drive the reciprocating movement of the main beam, the actuator comprising:
        a ball screw;
        a motor having an output shaft operably coupled to the ball screw and configured to drive selective rotation of the ball screw; and
        a disconnect mechanism, comprising:
            a disconnect fitting rotatably mounted to the ball screw; and
            a biasing fitting engaging the disconnect fitting to rotate the disconnect fitting between a first position and a second position, wherein the disconnect fitting transfers rotation of the output shaft to the ball screw when the disconnect fitting is in the first position, and the ball screw is isolated from the output shaft when the disconnect fitting is in the second position.

2. The aircraft landing gear of claim 1, wherein the motor drives rotation of a gear having a splined surface, and the disconnect fitting includes an engagement element disposed on an elongate member, wherein rotation of the disconnect fitting engages and disengages the engagement element from the splined surface.

3. The aircraft landing gear of claim 2, wherein the elongate member has a first end and a second end, the first end and the second end defining an angle therebetween.

4. The aircraft landing gear of claim 3, wherein the angle is between 100° and 150°.

5. The aircraft landing gear of claim 3, wherein the biasing fitting is configured for sliding translation along a centerline of the ball screw between a connection position and an isolation position, wherein translation of the biasing fitting from the isolation position to the connection position engages the biasing fitting with the first end of the elongate member to rotate the disconnect fitting.

6. The aircraft landing gear of claim 5, wherein the biasing fitting has an ovoid shape.

7. The aircraft landing gear of claim 5, wherein engagement of the biasing fitting with the elongate member when the biasing fitting is in the connection position maintains engagement of the engagement element with the splined surface.

8. The aircraft landing gear of claim 7, wherein translation of the biasing fitting from the connection position to the isolation position engages the biasing fitting with the second end of the elongate member to rotate the disconnect fitting.

9. The aircraft landing gear of claim 7, wherein engagement of the biasing fitting with the second end of the elongate member when the biasing fitting is in the isolation position prevents engagement of the engagement element with the splined surface.

10. The aircraft landing gear of claim 5, wherein the biasing fitting is coupled to a first end of a rod slidingly disposed within the ball screw for translational movement along the centerline of the ball screw.

11. The aircraft landing gear of claim 10, wherein an actuation element is coupled to a second end of the rod, the actuation element being configured to move the biasing fitting from the connection position to the isolation position.

12. The aircraft landing gear of claim 11, wherein the actuation element is a cable.

13. The aircraft landing gear of claim 11, wherein the disconnect mechanism further comprises a biasing element urging the biasing fitting toward the connection position.

14. The aircraft landing gear of claim 13, wherein the disconnect mechanism further comprises a locking feature configured to resist the biasing element to maintain the biasing fitting in the isolated position.

15. The aircraft landing gear of claim 14, wherein the locking feature comprises a locking fitting slidably received within an aperture formed in the rod when the biasing fitting is in the isolated position.

* * * * *